Patented Dec. 15, 1953

2,662,826

UNITED STATES PATENT OFFICE 2,662,826

SELF-GLAZING CERAMIC COMPOSITIONS

Paul Schuepp, Tarbes, France, assignor to Compagnie Generale d'Electro-Ceramique, Paris, France, a French corporation No Drawing. Application October 30, 1950,
Serial No. 193,039

5 Claims. (Cl. 106—45)

The ceramic compositions of the ternary diagram MgO—SiO₂—Al₂O₃ having high mechanical strength and low thermal expansion are well known. It is also known that they possess the property of giving with a slight addition of alkaline oxides Na₂O or K₂O or alkaline earth oxides such as CaO, compositions which become covered on burning with a fine layer of glaze, whilst the fragment possesses on the inside a dull fracture apparently free from vitreous phase.

In this manner white ceramic pieces are obtained which are covered with a transparent glaze, the thickness of which may moreover vary with the duration of the burning. This self-glazing property is all the more valuable as the pastes containing a high proportion of cordierite mineral are characterised by a very low coefficient of expansion, of the order of 2 to 3×10⁻⁶, and the agreement with ordinary glazes or enamels is practically impossible.

The formula of cordierite is MgOAl₂O₃2.5SiO₂ and its composition is 50.7% SiO₂
14.9% MgO
34.4% Al₂O₃ which formula and composition correspond generally to the basis of the composition according to the present invention as hereafter described.

The cordierite may contain impurities carried, for example, by the clay or the steatite, for example, an oxide of iron.

It has now been observed that the addition to these compositions of metallic oxides such as cobalt oxide, copper oxide, chromite or certain substances such as Si or SiC, in pulverulent form, imparts to the ceramic material a colouration which varies with the nature and the proportion of colouring agent, without modifying its fundamental properties of high mechanical strength, low coefficient of expansion and self-glazing.

The compositions according to the invention agree with the general formula:

| | Per cent |
|---|---|
| SiO₂ | 45 to 60 |
| MgO | 9 to 15 |
| Al₂O₃ | 30 to 45 |
| Na₂ or K₂O | less than 2 |
| or CaO or an alkaline earth oxide | less than 5 |
| Colouring matter | less than 5 | corresponding to a mineral composition agreeing with the formula:

| | Per cent |
|---|---|
| Steatite | 30 to 36 |
| Clay | 40 to 50 |
| Al₂O₃ | 20 to 25 |
| Alkali | less than 2 |
| or alkaline earth oxide | less than 5 |
| Colouring matter | less than 5 |

The colouring matter may be an oxide of Au, Cu, Cd, V, Cr, Mo, W, Se, Mn, Fe, Co, Ni or a mixture or combination of these oxides, which will be designated for the sake of simplicity in the text as "metallic oxide." Thus with 2% of chromite a self-glazing buff-coloured ceramic material is obtained; with 2% of oxide of Cu a self-glazing ceramic material is obtained of a pale gray colour; and with 2% of Co a self-glazing ceramic material is obtained of a fine dark blue colour.

By diminishing the quantity of metallic oxide added, the intensity of the colouration is reduced. It is also possible to add instead of or to the metallic oxides substances such as Si, SiC, Mo, or W in pulverulent state.

An addition of Si or SiC imparts to the ceramic material a dark colouring, at the same time improving the thermal conductivity, and consequently the behaviour under thermal shock, of these ceramic compositions, which is already very high on account of the low thermal expansion.

The ceramic compositions thus obtained can be worked by all the known ceramic processes, and in particular by drawing, dry or wet pressing, or moulding. The products obtained by burning have a beautiful brilliant colouration.

It has also been observed that a slip of these compositions, whether possessing a colouring material or not can be used as a glaze or enamel, which is of particular interest for the glazing of composition with a basis of cordierite, with low expansion and not self-glazing, with which no ordinary glaze is capable of agreeing.

These non-self-glazing compositions based on cordierite, whether containing one of the colouring agents previously mentioned or not, can be covered by enamelling with a slip, in accordance with the invention, of a layer of a ceramic composition the coefficient of expansion of which is of the same order of magnitude as their own, and which, becoming self-glazed in burning, imparts the glazed appearance to the whole.

Of course these slips used as a glaze may include a colouring agent as mentioned previously, so that it is possible to have a range of coloured glazes.

This makes it possible to solve, on ceramic materials with low coefficients of expansion, all the problems of marking, decoration and glazing. The characteristic properties of a ceramic composition according to the invention are utilised in a particularly advantageous manner in the realisation of certain industrial products which also form the subject of the invention.

It is thus possible to form ceramic pieces of apparatus or equipment which have to be coloured and glazed for esthetic reasons, such as colour harmony with the whole of the equipment, or for practical reasons, such as dark colouring to avoid the appearance of stains or marks of mounting. These parts being coloured in the mass can if necessary be treated by dressing, grinding or boring for instance, without there appearing or showing, as in the case of white parts which are superficially glazed in a dark colour, the white colour of the substance.

It is likewise possible to make glazed pieces with ceramic compositions having a basis of cordierite, the high qualities of which both from a mechanical and from a thermal point of view have already been pointed out. These compositions according to the invention also prove to be equally advantageous in their application to the manufacture of utensils which have to go on the fire, by reason of the low coefficient of expansion, making them particularly resistant to thermal shocks. Among these utensils there should be mentioned specially laboratory utensils such as crystallising vessels, pans, evaporating dishes, crucibles, spatulas, fluid-tight and fire-proof ceramic tubes etc.

The property of these compositions of being able to be worked by moulding makes it possible to obtain utensils of small thickness, which favours resistance to thermal shocks.

The property of self-glazing reduces the difficulty of glazing thin objects.

The dark colouration which it is possible to give them has the great advantage of facilitating the observation of precipitates.

What I claim is:

1. A ceramic composition containing by weight 45 to 60 percent of silica, 9 to 15 percent of magnesia, 30 to 45 percent of alumina, and an addition of metallic oxides chosen from the group consisting of alkali metal oxides and alkaline earth oxides and of coloring material selected from the group consisting of Si, SiC, W, Mo, the oxides of Au, Cu, Cd, V, Cr, Mn, W, Mo, Co, Ni, these metallic oxides and this coloring material being in such proportions that the composition will be self-glazing and colored in the mass by firing.

2. A ceramic composition according to claim 1, wherein the proportion of alkali oxide is below 2 percent and that of coloring matter below 5 percent.

3. A ceramic composition according to claim 1, wherein the proportions of alkaline earth oxide and of coloring material are each below 5 percent.

4. Barbotine obtained with the ceramic composition according to claim 1, and used for the enameling of ceramic masses, with small expansion and not self-glazing.

5. Shock resistant pieces of apparatus and laboratory utensils of ceramic material of small expansion, self-glazed and colored by firing having a composition according to claim 1.

PAUL SCHUEPP.

References Cited in the file of this patent

UNITED STATES PATENTS

| Number | Name | Date |
| --- | --- | --- |
| 883,286 | Buchner | Mar. 31, 1908 |

OTHER REFERENCES

Ceramic Industry, January 1945, page 85.